Oct. 15, 1935.   A. STOFFEL, NÉE VON DER HÖDEN   2,017,478
DEVICE FOR IRONING NECKTIES
Filed Dec. 19, 1934

Inventor:
Anna Stoffel

Patented Oct. 15, 1935

2,017,478

UNITED STATES PATENT OFFICE 2,017,478

DEVICE FOR IRONING NECKTIES

Anna Stoffel, née von der Höden, Dusseldorf, Germany

Application December 19, 1934, Serial No. 758,335
In Germany April 15, 1932

1 Claim. (Cl. 68—26)

This invention relates to devices for smoothing and removing creases from open-ended neckties and has for its main object to provide a device whereby a necktie can be ironed from the inside by relative movement between ironing device and tie.

Another object of the invention is to provide a tie-ironing device adapted to be heated internally by inserting an electric heating unit or by introducing a heated solid body or liquid so that the device can be utilized in practically all circumstances without limitation to the availability of electricity for instance.

Another object of the invention is to provide in such a tie-ironing device, a handle removably mounted at a point spaced from one end towards the other and adapted to be positioned to extend towards either end to enable the ironing pressure to be modified.

These and other features of the invention will now be more fully described with reference to the drawing.

Figure 1:
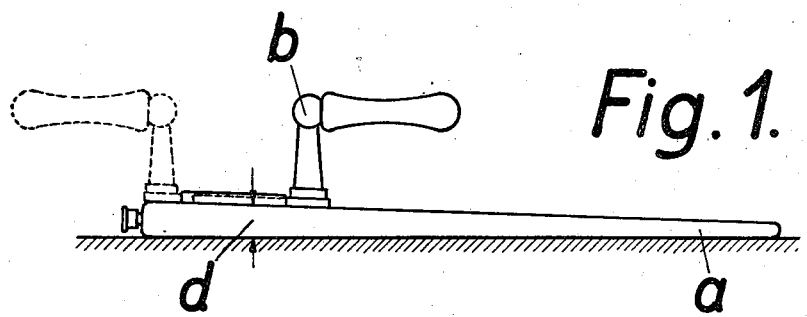
Fig. 1 shows a side view of a preferred embodiment
Figure 2:
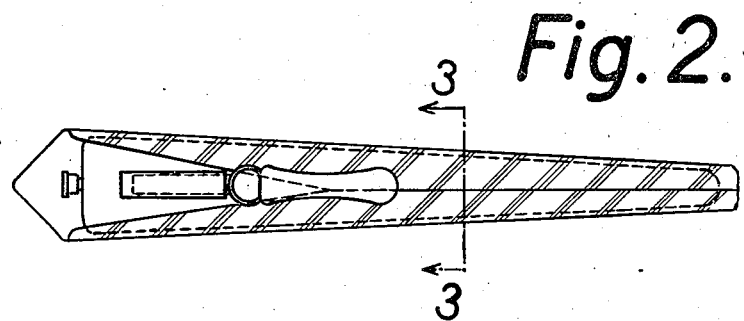
Fig. 2 shows a plan view of the device of Fig. 1 inserted in a tie.
Figure 4:
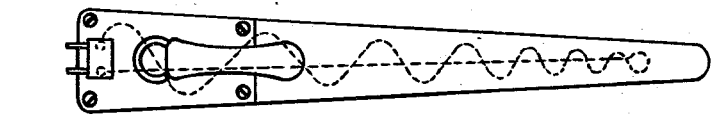
Fig. 4 shows a plan view of a modified form incorporating an electric heating unit.

The body portion $a$ of the tie-ironing device, which is hollow and adapted to accommodate suitable heating means, is of a configuration similar to but of dimensions smaller than the end of the tie (Fig. 2). The heating means may take the form of an electric heating unit as indicated in Fig. 4 or a heated solid body or a heated liquid, e. g., boiling water, which may be introduced into the hollow body-portion $a$, Figs. 1 and 2. When a heated liquid is used for heating the tie-ironing device provision will be made for a liquid-tight closure to the hollow body-portion $a$. Mounted on the hollow body portion $a$ is a handle $b$ which may have a foot adapted to be inserted in a channel formed on the body portion $a$ (Figs. 1 to 3) or may be carried by a plate secured to the body portion $a$ by means of screws (Fig. 4). The handle is preferably reversible on its mounting as indicated in Fig. 1 so as to enable it to be positioned extending parallel to the hollow body portion $a$ towards either end as desired so as to modify the distribution of the ironing pressure. As seen from Figs. 1, 2, and 4 the point of mounting the handle $b$ is spaced away from the broad end of the body portion $a$ towards the narrow end.

Figure 3:
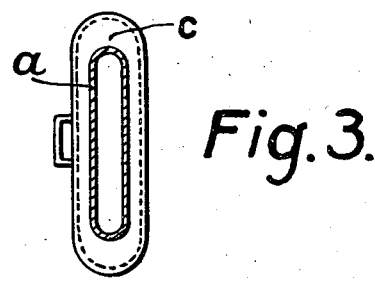
Fig. 3 is a cross sectional view taken along the line 3—3 of Fig. 2 but with the handle removed.

To enable the ironing motion to be performed within the tie both in the longitudinal and transverse directions, the body portion $a$ has smoothly rounded edges $c$ as shown in Fig. 3 as well as rounded ends. Also to facilitate the introduction of the ironing device into the tie the narrow end of the device may be made somewhat less than the thickness $d$ adjacent the wide end.

It will be apparent that the embodiment described and shown is only illustrative and not exhaustive of the invention, which includes all modifications and variations falling within the ambit of the appended claim.

What I claim is:

An iron for ironing open-ended neckties, comprising a thin body tapering both in width and thickness from one end to the other, all of the edges of said body being rounded so that the iron may be freely manipulated within a necktie, a handle extending longitudinally of the iron, and a single supporting member adjacent the wider and thicker end of the iron for securing the handle to the iron.

ANNA STOFFEL, NÉE VON DER HÖDEN.